Nov. 28, 1961 R. Y. PARADISE 3,011,076

HIGH EFFICIENCY SWITCHING POWER AMPLIFIER

Filed Sept. 30, 1959 2 Sheets-Sheet 1

RONALD Y. PARADISE
INVENTOR.
BY Andrew L. Bain
George J. Seligsohn
ATTORNEYS

HIGH EFFICIENCY SWITCHING POWER AMPLIFIER

Filed Sept. 30, 1959 2 Sheets-Sheet 2

AMPLITUDE OF SIGNAL VOLTAGE EQUAL TO AMPLITUDE OF REFERENCE VOLTAGE

AMPLITUDE OF SIGNAL VOLTAGE EQUAL TO 1/2 AMPLITUDE OF REFERENCE VOLTAGE

INPUT VOLTAGE = 0

RONALD Y. PARADISE
INVENTOR.

BY Andrew L. Bain
George B. Oujevolk
ATTORNEYS

United States Patent Office 3,011,076

Patented Nov. 28, 1961

3,011,076

HIGH EFFICIENCY SWITCHING POWER AMPLIFIER

Ronald Y. Paradise, Garfield, N.J., assignor to General Precision, Inc., a corporation of Delaware Filed Sept. 30, 1959, Ser. No. 843,494
6 Claims. (Cl. 307—88.5)

This invention relates to alternating signal-controlled switching means and, more particularly, to a high efficiency switching power amplifier.

It is often desirable to control the power applied to a load in accordance with the amplitude of an input alternating signal. One such case, for instance, is the control of a servo motor load in accordance with the output signal derived from a synchro receiver. In nearly all such cases, it is necessary to insert a power amplifier between the input alternating signal and the load. In addition, a voltage preamplifier may also be necessary.

The big disadvantage of present day power amplifiers is that they consume as much, if not more, power than is delivered to the load. This results in larger power supplies, heat generated by the power amplifier which must be dissipated, etc.

The power amplifier contemplated by the present invention is effectively a switch which has substantially no voltage thereacross when the switch is closed and conducting current, and which has a substantial voltage thereacross only when the switch is open and does not conduct current. The switch, which may take the form of a transistor, is maintained closed for a fraction of each period of the input alternating signal, the magnitude of the fraction being determined by the amplitude thereof.

It is therefore an object of the present invention to provide alternating current controlled switching means.

It is further object of this invention to provide an improved power amplifier having very high efficiency.

One feature of the present invention is the provision of phase sensitive means responsive to the relative phase difference between first and second alternating signals applied thereto for maintaining a signal controlled switch in one of its open or closed conditions for a fraction of each period of the alternating signals which is determined by the relative phase difference between the alternating signals. The relative phase difference between the alternating signal, in turn, is determined by the amplitude of the input alternating signal.

These and other objects, features and advantages of the present invention will become more apparent from the following detailed description taken together with the accompanying drawing, in which.

Figure 1:
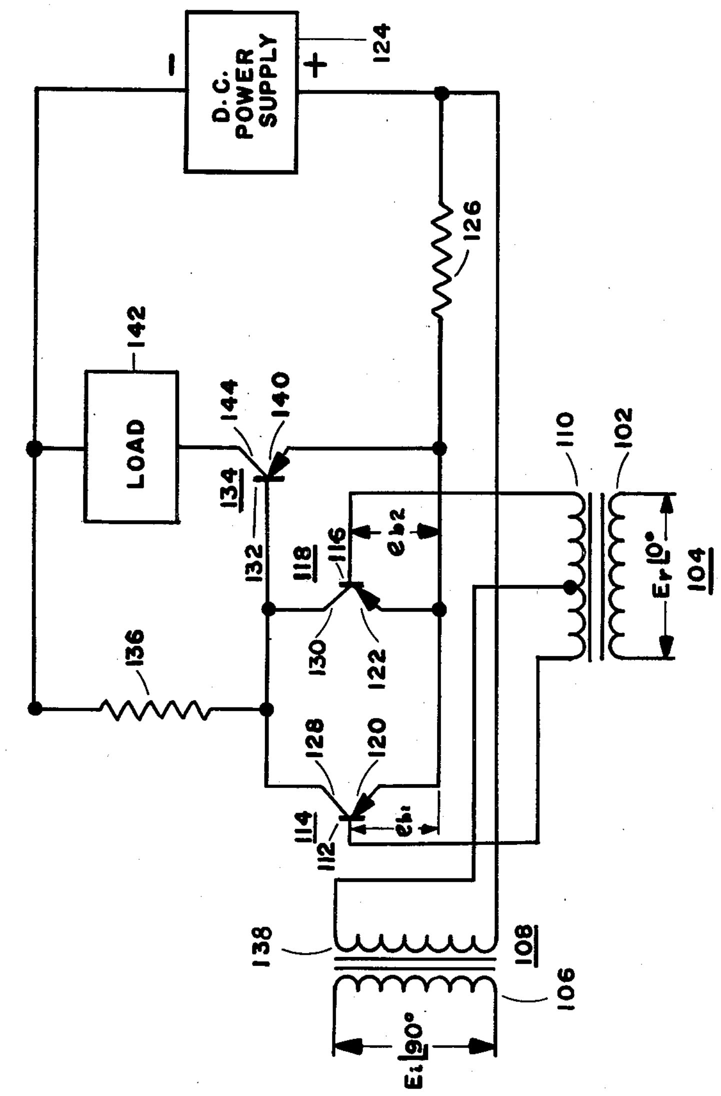
FIGURE 1 is a schematic showing of a preferred embodiment of the present invention.
Figure 4:
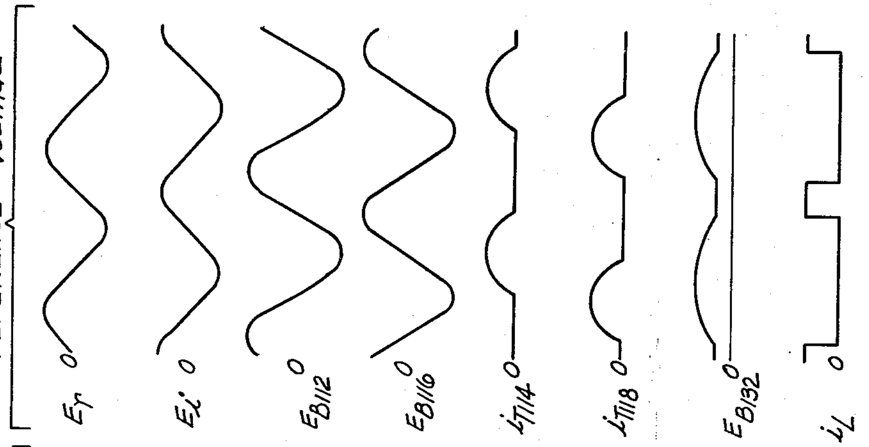
FIG. 4 is a waveform representation of the voltages through various components of FIG. 1 under still other conditions.
Figure 3:
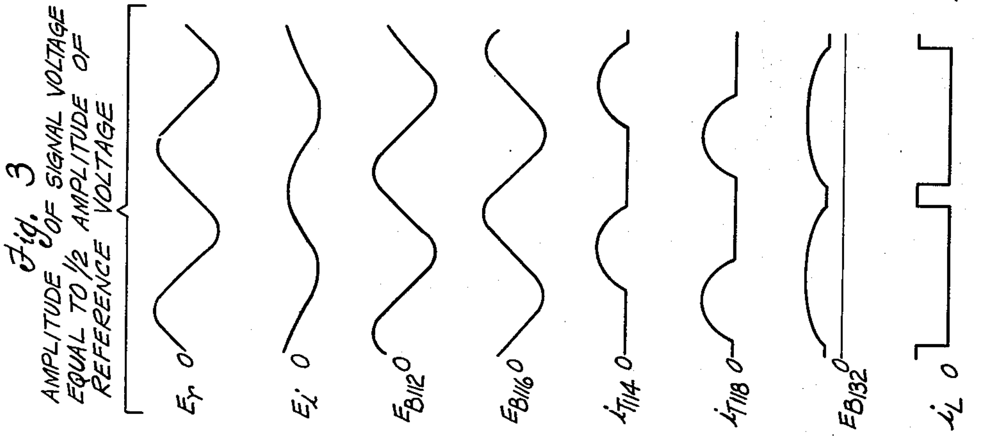
FIG. 3 is a waveform representation of the voltages through various components of FIG. 1 under conditions other than those of FIG. 2.
Figure 2:
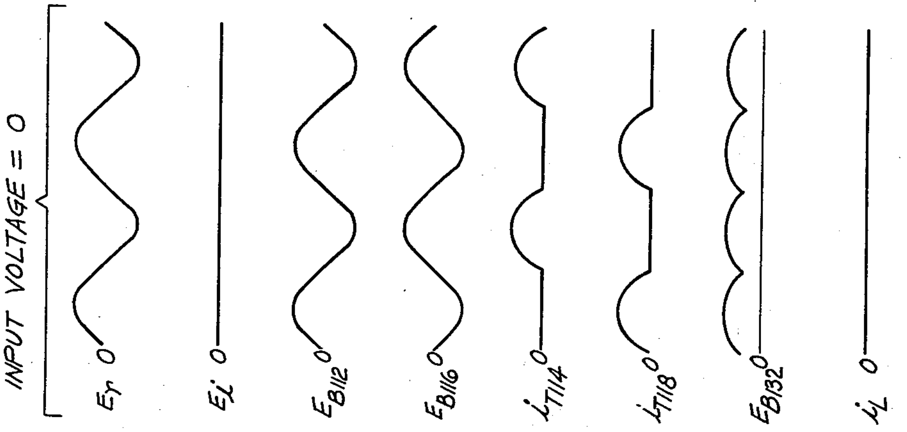
FIG. 2 is a waveform representation of the voltages through various components of FIG. 1 under certain conditions.

Referring now to the drawing, a reference alternating voltage $E_r$ having a given frequency and a fixed amplitude is applied to primary winding 102 of transformer 104. An input alternating voltage $E_i$, having the same given frequency as reference alternating voltage $E_r$, but which is 90° out of phase with respect thereto, is applied to primary winding 106 of transformer 108. The amplitude of input alternating voltage $E_i$ is not fixed, but may vary over a given range.

One end of secondary winding 110 of transformer 104 is connected to base electrode 112 of transistor 116 and the other end of secondary winding 110 of transformer 104 is connected to base electrode 116 of transistor 118.

Both emitter electrode 120 of transistor 114 and emitter electrode 122 of transistor 118 are connected to the positive terminal of D.C. power supply 124 through positive feedback resistance 126. Collector 128 of transistor 114 and collector electrode 130 of transistor 118 are connected to base electrode 132 of switching transistor 134. In addition, collector electrodes 128 and 130 and base electrode 132 are connected to the negative terminal of D.C. power supply 124 through relatively high resistance 136.

The center tap of secondary winding 110 of transformer 104 is connected to one end of secondary winding 138 of transformer 108. The other end of secondary winding 138 of transformer 108 is connected directly to the positive terminal of D.C. power supply 124.

Emitter electrode 140 of switching transistor 134, as shown, is connected to the positive terminal of D.C. power supply 124 through positive feedback resistance 126. Positive feedback resistance 126, although beneficial in the operation of the present invention, is not essential thereto. Therefore, positive feedback resistance 126 may be omitted. In this case, the emitter electrodes 120, 122 and 140, respectively, of transistors 114, 118 and switching transistor 134, respectively, would be connected directly to the positive terminal of D.C. power supply 124.

Load 142 is connected, as shown, between collector electrode 144 of switching transistor 134 and the negative terminal of D.C. power supply 124.

Considering now the operation of the disclosed device, assume first that the amplitude of input alternating voltage $E_i$ is zero. In this case, secondary winding 110 of transformer 104 will apply a first alternating potential to base electrode 112 of transistor 114 and a second alternating potential to base electrode 116 of transistor 118, which first and second alternating potentials will be 180° out of phase with respect to each other. The first and second alternating potentials are of sufficient amplitude to overdrive transistors 114 and 118. Each of transistors 114 and 118 will conduct during the negative half-cycles of the alternating potential applied to the base electrode thereof, and will be cut off during the positive half-cycles of the alternating potential applied to the base electrode thereof. Since the first and second alternating potentials, in the case under discussion, are 180° out of phase with respect to each other, it follows one or the other of transistors 114 and 118 is conducting at all times.

The current through relatively high resistance 136 is equal to the sum of the currents through the base-emitter path of transistor 134 and any current conducted by transistor 114 or 118. Therefore, conduction by either of transistors 114 or 118 results in increasing the voltage drop developed across resistance 136. This causes base electrode 132 of switching transistor 134 to assume a relatively positive value, which is sufficient to maintain switching transistor 134 cut off. Therefore no power is delivered to load 142.

Now assume that an input alternating signal $E_i$ is applied to primary winding 106 of transformer 108. In this case, the alternating voltage $e_{b1}$ applied as an input to transistor 114 is equal to the sum of the input alternating voltage appearing across secondary winding 138 of transformer 108 and the reference alternating voltage appearing across the left half of secondary winding 110 of transformer 104, and the alternating voltage $e_{b2}$ applied as an input to transistor 118 is equal to the sum of the input alternating voltage appearing across secondary winding 138 of transformer 108 and the reference alternating voltage appearing across the right half of secondary winding 110 of transformer 104. Since the reference alternating voltages appearing across the left and right halves, respectively, of secondary winding 110 of transformer 104 are 180° out of phase with respect to each other, and the input alternating signal appearing across secondary winding 138 of transformer 108 is in quadrature with both these references alternating voltages, alternating voltage $e_{b1}$ will be shifted in phase in one direction by an amount determined by the amplitude of input alternating voltage $E_1$ and alternating voltage $e_{b2}$ will be shifted in phase in the other direction by the same amount.

Thus it will be seen that for a fraction of each period of the alternating voltage determined by the phase shift between alternating voltages $e_{b1}$ and $e_{b2}$, which, in turn, is determined by the amplitude of input alternating voltage $E_1$, neither transistor 114 nor transistor 118 conducts. During this fraction of a period, the voltage drop across resistance 136 decreases. Therefore, the potential on base electrode 132 of switching transistor 134, which becomes more negative, now permits switching transistor 134 to conduct, causing power to be delivered to load 142 during this fraction of a period. It will be seen that the average power delivered to load 142 is proportional to the magnitude of the fraction of the period during which switching transistor 134 conducts.

Positive feedback resistance 126, which is responsive to the current through switching transistor 134, provides positive feedback to transistors 114 and 118 to ensure that the leading and lagging edges of the fraction of each period during which switching transistor 134 conducts are extremely steep. By making these leading and lagging edges steep, the power delivered to the load is maximized and the power dissipated by switching transistor 134 is minimized.

In energizing a servo motor it is desirable that no net D.C. magnetic field be produced. Therefore, when the present invention is used to energize the control winding of a servo motor, it is desirable that the control winding be center-tapped, and that each half of the control winding be energized by a separate switching power amplifier, such as shown in the drawing, the two switching power amplifiers being operated in push-pull with respect to the input alternating voltage applied.

Although alternating voltages have been used throughout in describing the present invention it is clear that it is within the skill of the art to substitute alternating currents for any or all the alternating voltages. It is therefore intended that the term alternating signal be generic to both alternating voltage and alternating current.

Furthermore, although only a prefered embodiment of the invention has been described herein, it is not intended that the invention be restricted thereto, but that it be limied solely by the time, spirit and scope of the appended claims.

I claim:

1. In combination, a D.C. power supply having positive and negative terminals, a resistance having one end thereof connected to one of said terminals, first and second signal-controlled switches each have one end thereof connected to the other of said terminals and the other end thereof connected to the other end of said resistance, whereby the other end of said resistance is at a first potential when at least one of said first and second signal-controlled switches is rendered conductive and is at a second potential when neither of said first and second signal-cotrolled switches is rendered conductive, a load having one end thereof connected to said one of said terminals, control means including a potential-controlled switch connecting the other end of said load to the other one of said terminals for energizing said load in response to said potential-controlled switch being conductive, means for connecting the other end of said resistance to said potential-controlled switch for rendering said potential-controlled switch conductive when said other end of said resistance is at said second potential and for rendering said potential-controlled switch non-conductive when said other end of said resistance is at said first potential, reference signal means for applying a first alternating signal of a given frequency to said first signal-controlled switch for rendering said first signal-controlled switch conductive during alternate half-cycles of said first alternating signal and for applying a second alternating signal of the same given frequency to said second signal-controlled switch for rendering said second signal-controlled switch conductive during corresponding alternate half-cycels of said second alternating signal, said first and second alternating signal normally being 180° out of phase, and input signal means coupled to said reference signal means for shifting the relative phase of said first and second alternating signals with respect to each other in accordance with the magnitude of an input signal applied thereto.

2. The combination defined in claim 1, wherein said reference signal means includes a first transformer having a primary winding and a center-tapped secondary winding and means for applying a reference alternating signal having said given frequency and a given phase to said primary winding of said first transformer, and wherein said input signal means includes a second transformer having a primary winding and a secondary winding, means for applying an input alternating signal having said given frequency, a variable amplitude and a phase in quadrature with said given phase to said primary winding of said second transformer, and means for connecting one end of said secondary winding of said second transformer to the center tap of said first transformer, the alternating signal between one end of said secondary winding of said first transformer and the other end of said secondary winding of said first transformer and the other end of said secondary winding of said second transformer being said first alternating signal and the alternating signal between the other end of said secondary winding of said first transformer and the other end of said secondary winding of said second transformer being said second alternating signal.

3. The combination defined in claim 2, wherein said potential-controlled switch and said first and second signal-controlled switches each includes a transistor having an emitter electrode, a collector electrode and a base electrode, said collector electrodes of said first and second signal-controlled switch transistors and the base of said potential-controlled switch transistor being connected to the other end of said resistance, said first alternating signal being applied to the base electrode of said first signal-controlled switch transistor, and said second alternating signal being applied to the base electrode of said second signal-controlled switch transistor, the collector electrode of said potential-controlled switch transistor being connected to the other end of said load, and wherein said control means further includes means for connecting the emitter electrodes of said signal-controlled switch transistors and said potential-controlled switch transistor to said other one of said terminals of said power supply.

4. The combination defined in claim 3, wherein said control means includes feedback means responsive to said potential-controlled switch transistor being rendered conductive for providing positive feedback to said first and second signal-controlled switch transistors.

5. In combination, a D.C. power supply having positive and negative terminals and leads therefrom; a resistance having one end thereof connected to one of said terminal leads; first and second signal-controlled transistor switches each having an emitter, collector, and a base, the emitters being connected to the other of said terminal leads, and the collector being connected to the other end of said resistance whereby the other end of said resistance is at a first potential when at least one of said first and second signal-controlled transistor switches is rendered conductive and is at a second potential when neither of said first and second signal-controlled transistor switches is rendered conductive; a load having one end thereof connected to said one of said terminal leads; control means including a transistor potential-controlled switch having an emitter, collector and base, said collector being connected to the other end of said load, said emitter being connected to the other one of said terminal leads for energizing said load in response to said potential-controlled transistor switch being conductive, said base being connected to the other end of said resistance rendering said potential-controlled transistor switch conductive when said other end of said resistance is at second potential and rendering said potential-controlled transistor switch non-conductive when said other end of said resistance is at said first potential; reference signal means for applying a first alternating signal of a given frequency to said first signal-controlled transistor switch base for rendering said first signal-controlled switch conductive during alternate half-cycles of said first alternating signal and for applying a second alternating signal of the same given frequency to said second signal-controlled transistor switch base for rendering said second signal-controlled switch conductive during corresponding alternate half-cycles of said second alternating signal, said first and second alternating signals normally being 180° out of phase, said reference signal means including a first transformer having a primary winding and a center-tapped secondary winding and means for applying a reference alternating signal having said given frequency and a given phase to said primary winding of said first transformer; input signal means coupled to said reference signal means for shifting the relative phase of said first and second alternating signals with respect to each other in accordance with the magnitude of an input signal applied thereto, said input signal means including a second transformer having a primary winding and a secondary winding, means for applying an input alternating signal having said given frequency, a variable amplitude and a phase in quadrature with said given phase to said primary winding of said second transformer, and means connecting one end of said secondary winding of said second transformer to the center tap of said first transformer, the alternating signal between one end of said secondary winding of said first transformer and the other end of said secondary winding of said first transformer and the other end of said secondary winding of said second transformer being said first alternating signal and the alternating signal between the other end of said secondary winding of said first transformer and the other end of said secondary winding of said second transformer being said second alternating signal; and, feedback means in said control means responsive to said potential-controlled switch transistor being rendered conductive for providing positive feedback to said first and second signal-controlled switch transistors, said feedback means being incorporated in said power supply lead connecting the emitters of said signal-controlled switch transistors and said potential-controlled switch transistor emitter.

6. The combination defined in claim 5, wherein said feedback means includes an unbypassed resistance connected between the emitter electrodes of said signal-controlled switch transistors and said potential-controlled switch transistor and said other one of said terminals of said power supply, and means for connecting said other end of the secondary winding of said second transformer directly to said other one of said terminals of said power supply.

References Cited in the file of this patent

UNITED STATES PATENTS

| | | |
|---|---|---|
| 2,698,392 | Herman | Dec. 28, 1954 |
| 2,809,339 | Guggi | Oct. 8, 1957 |
| 2,831,127 | Braicks | Apr. 15, 1958 |
| 2,832,051 | Raisbeck | Apr. 22, 1958 |
| 2,858,456 | Royer | Oct. 28, 1958 |
| 2,885,570 | Bright | May 5, 1959 |
| 2,957,137 | Robinson | Oct. 18, 1960 |

OTHER REFERENCES

"Junction Transistor Electronics," by Hurley, published 1958 by John Wiley, New York, page 406.